Sept. 18, 1951 A. J. KIZAUR 2,568,236
TILTING CANTILEVER TABLE TOP STRUCTURE
Filed Jan. 26, 1948 2 Sheets-Sheet 1
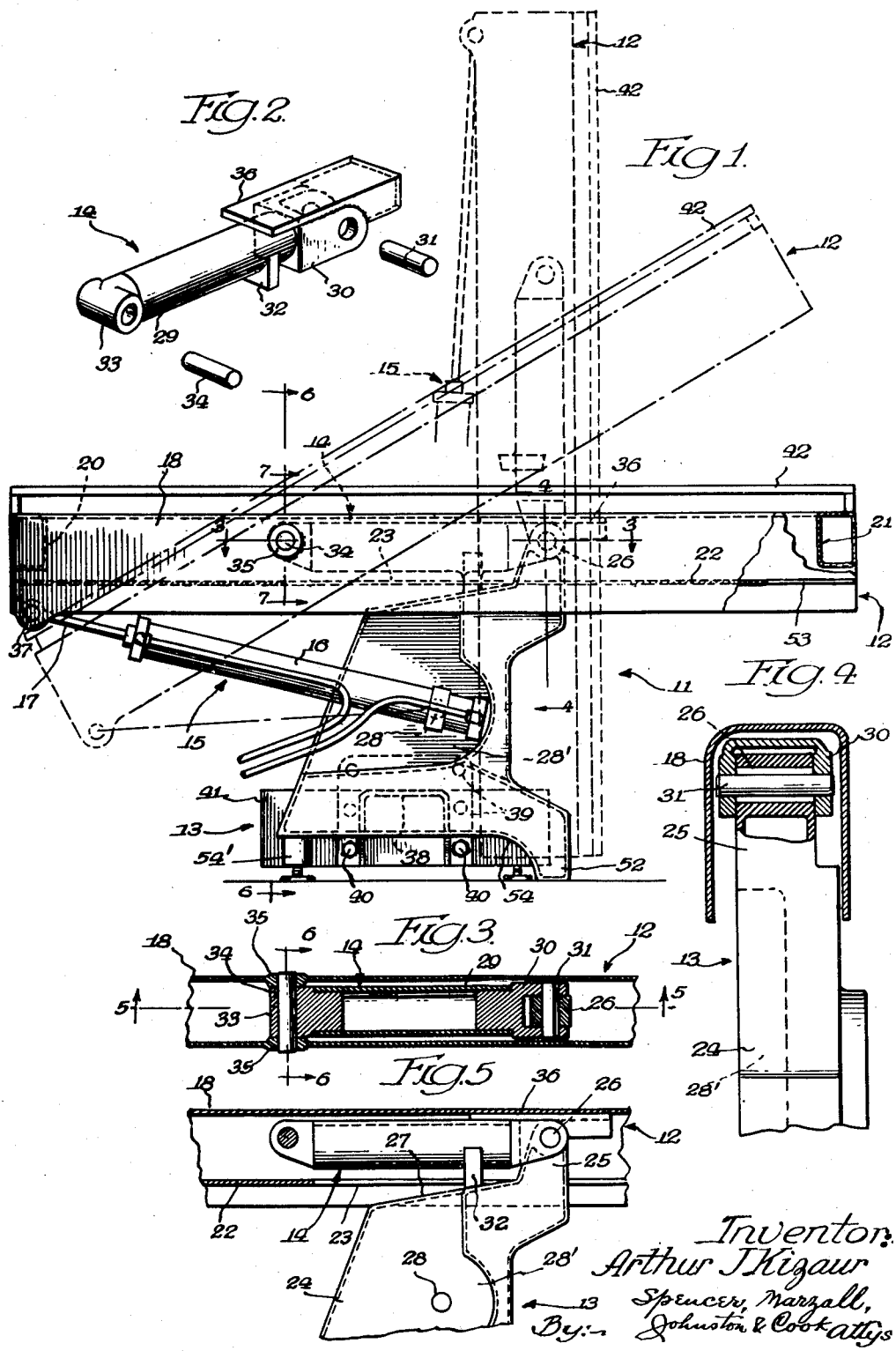

Sept. 18, 1951 A. J. KIZAUR 2,568,236
TILTING CANTILEVER TABLE TOP STRUCTURE
Filed Jan. 26, 1948 2 Sheets-Sheet 2
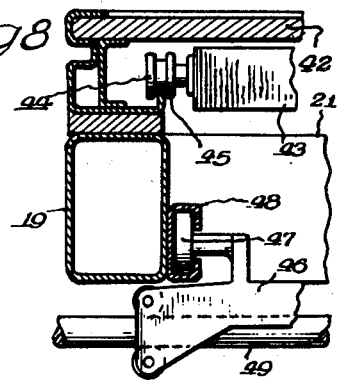
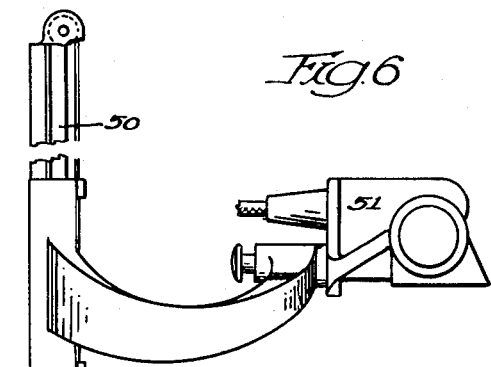
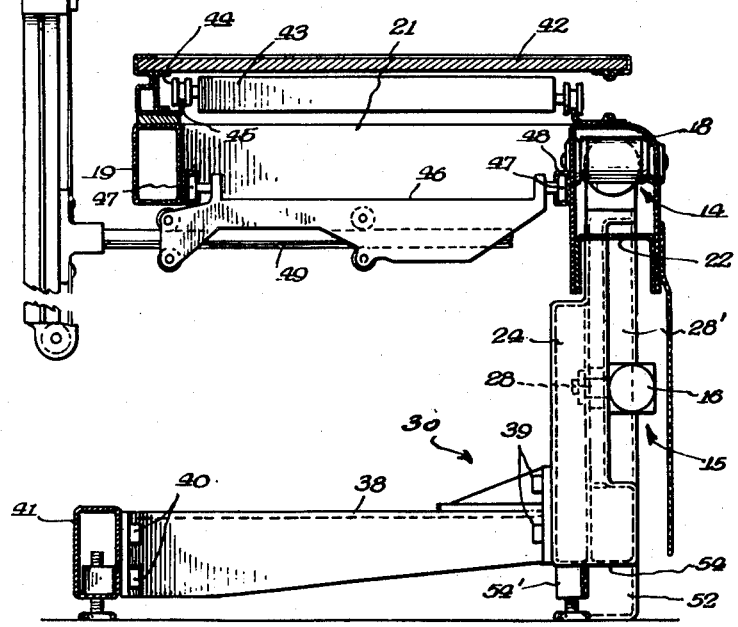
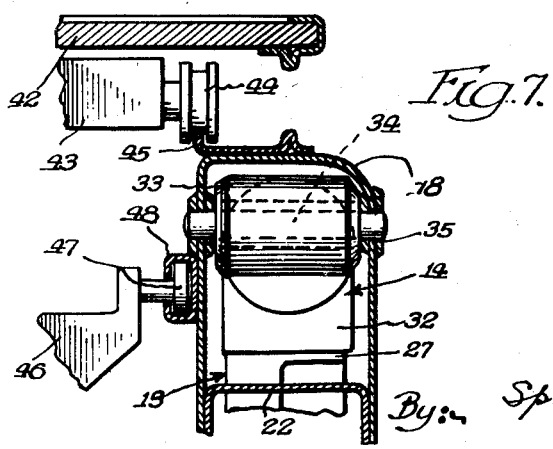
Inventor:
Arthur J. Kizaur
By: Spencer, Marzall, Johnston & Cook
Attys

UNITED STATES PATENT OFFICE 2,568,236

TILTING CANTILEVER TABLE TOP STRUCTURE

Arthur J. Kizaur, Wauwatosa, Wis., assignor to General Electric Company, a corporation of New York Application January 26, 1948, Serial No. 4,446

10 Claims. (Cl. 311—6)

The present invention relates in general to support tables, and has more particular reference to an improved tilting structure well adapted for use in supporting human bodies, selectively, in vertical, horizontal and intermediate positions, the table structure being especially suited for use in connection with X-ray fluoroscopic examination and treatment of bodies supported on the table, and for radiographic purposes.

An important object of the present invention is to provide a strong and rigid yet relatively light weight table structure supported in cantilever fashion, on one side of the table only, the other side of the table structure being unsupported; a further object being to provide tilting table support means comprising a single link element pivoted at spaced bearing stations therein, respectively on a table support base and on the table top structure, at one side thereof only, said link element being adapted to carry the table structure at any desired inclination between horizontal and vertical positions facing one direction, and between horizontal and a substantial angle of tilt of the order of at least 30° in the opposite direction; a still further object being to provide means for tiltably supporting a table entirely on one side thereof, thereby leaving the other side free and unobstructed, so that carrying means for radiographic, or other equipment, may be mounted on the table for unhampered adjustment along the opposite, unsupported side of the table.

Another important object is to provide novel tiltable table support means comprising a single, relatively rigid, preferably tubular arm or link connected at spaced points therein for pivotal movement, respectively, on a support base and on the table, whereby to provide for the support of the table in cantilever fashion, on one side thereof only, while allowing extensive tilting movement of the table in either direction.

Another important object is to provide a table structure of the character mentioned wherein the supporting arm or link, is enclosed within the frame of the table, at one side thereof.

Another important object is to form the table as a framework comprising hollow, tubular members, and to form the support pedestal, at least in part, of hollow, sheet metal structural elements in order to provide a rigid, yet relatively light weight pedestal and table structure; a further object being to provide a pedestal having its lower portions cut away to provide toe space for an operator, thus enabling him to approach the table closely on its support pedestal side.

Among the other important general objects of the invention is to provide a cantilever table support structure of unusual rigidity so that the table, even when heavily loaded and tilted, will support its load accurately in precise position.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a side view of table apparatus embodying the present invention;

Fig. 2 is a perspective view of an arm or link forming a part of the tilting structure for connecting the table tiltably on its support structure;

Figs. 3 and 4 are sectional views taken substantially along the lines 3—3 and 4—4 in Fig. 1;

Fig. 5 is a sectional view taken substantially along the line 5—5 in Fig. 3;

Figs. 6 and 7 are sectional views taken substantially along the lines 6—6 and 7—7 in Fig. 1; and Fig. 8 is an enlarged sectional view taken through the unsupported side of the table frame.

To illustrate the invention, the drawings show an adjustable table structure 11 particularly well suited for supporting human bodies for examination, the structure being especially adapted for X-ray examination and therapy purposes, in that it is tiltably supported for movement between horizontal and various tilted positions in either direction, the table shown, indeed, being tiltable to vertical position in at least one direction and to a substantial degree of tilt of the order of 30°, or more, in the opposite direction. The table is preferably in excess of six feet in length and of adequate width to support a human body thereon at any desired inclination, between its limits of tilting movement in either direction. The table structure, as will appear, is also well adapted for the support of devices such as screens, diaphragms, cassettes, X-ray sources, and mechanism for the operation and control thereof, which may be mounted on the table in any suitable or preferred fashion for longitudinal and lateral adjustment thereon.

The table structure 11 may conveniently comprise a preferably rectangular frame 12, a support pedestal 13, and support means for tiltably supporting the table, in cantilever fashion, on one side of the table only, said support means comprising a single mounting arm or link 14, for mounting the table on the pedestal. An extensible operating device 15, preferably comprising a hydraulic cylinder 16 and a cooperating piston 17, may be operatively connected between the table and the pedestal for tilting the former with respect to the latter.

As shown, the frame 12 is preferably of hollow, sheet metal construction comprising a pair of spaced apart, longitudinally extending members 18 and 19, rigidly interconnected in spaced relationship by transverse bracing and spacing members 20 and 21, said members 18, 19, 20, and 21 preferably comprising tubular members of metal, such as steel, having preferably rectangular sectional configuration, although it will be apparent that the present invention is not necessarily limited to the rectangular sectional shape of the frame members. The frame members, of course, may be secured together in any suitable or convenient fashion, as by welding, whereby to provide an exceedingly rigid, yet relatively inexpensive frame structure, the preferred box-like character of the frame members affording a structure of unusual rigidity.

The frame member 18, on one side of the frame, is preferably substantially deeper than the member 19 forming the opposite side of the frame, the member 18 being preferably of U-shaped sectional configuration, with a longitudinally extending bracing and spacing plate 22 interconnected between and extending substantially throughout the length of the spaced side walls of the member 18. The central portions of this plate are cut away or omitted to form a gap or opening 23 therein at the central portions of the member 18, in order that the top of the pedestal 13 and the link 14 may extend through and operate in said opening.

The pedestal 13 preferably comprises an upright member 24 which may comprise a casting, for strength and rigidity; or it may comprise a fabricated sheet metal structure. Its upper end forms a mounting 25 for a suitable bearing 26, such as a needle bearing, while the lower portions of the upright are formed to rest upon the floor or other support base on which the table is to be supported. Adjacent the bearing mounting 25 the upright 24 may provide an upwardly facing shoulder 27, for a purpose hereinafter more fully explained. Beyond this shoulder, from the bearing 26, the upright may be formed with a cavity or recess 28', in its forward face, in which the operating device 15 may be supported on the upright for tilting movement on a pivot mounting 28 which serves to pivotally support one end of the operating device 15 on the pedestal.

The arm or link 14 preferably comprises a tubular member 29 forming a torque tube provided at one end with a fitting 30 comprising a bearing yoke adapted to pivotally connect the arm with the bearing 26, as by means of a bearing pin 31, whereby the arm 14 is pivotally supported on and at the top of the pedestal upright 24. Intermediate its ends, the member 14 may be provided with a downwardly extending stop member 32 in position to engage the shoulder 27 of the pedestal upright, in order to limit the movement of the arm or link 14 on the bearing 26 in a counterclockwise direction, viewing Fig. 5, the arm preferably occupying substantially horizontal position on the pedestal when the stop member 32 is in engagement with the seat 27. The arm 14, at its end remote from the fitting 30, is provided with a fitting 33 adapted to carry a pivot pin 34 for pivotally connecting the arm with the frame 12, the pin 34, to this end, extending at its opposite ends in bearings 35 formed on the spaced walls of the U-shaped member 18, said bearings being located within the box-like structure formed by the U-shaped member 18 and the strengthening plate 22.

The upper portions of the fitting 30 are preferably extended to form a bearing plate 36 on the arm 14, in position to engage the inner face of the member 18. The table frame 12, thus, is normally supported on the arm at the bearing 35 and at the bearing plate 36. The arm 14, in turn, is normally supported on the pedestal 13 by the bearing 26 and the shoulder 27. Accordingly, the table frame 12 may be supported in a normal, preferably horizontal position, on the pedestal, and may be tilted in either direction from such normal position. To this end, the operating device 15 may be pivotally connected, as at the bearing 26 on the pedestal upright, and at a bearing 37 on the frame 12, as at one end of the frame member 18. As shown, the cylinder 16 is pivotally connected on the bearing 28 and the piston 17 is connected at the bearing 37.

By operating the device 15 to project the piston 17, from a neutral or rest position, the frame 12 may be tilted in a clockwise direction, viewing Fig. 1, from the normal horizontal position to a substantially vertical position shown in dotted lines, the arm 14 during such movement turning on the pedestal 13 at the bearing 26, and moving with the frame 12, without any relative rotation between the arm 14 and the frame 12 at the pivot 34. Even when the table is in vertical position, its weight and the weight supported thereby will keep the table frame in bearing engagement with the plate 36.

By retracting the piston 17 in the cylinder 16, from its neutral position, the table frame 12 may be tilted from normal position, in the opposite, or counter-clockwise, direction, to the position shown in dashed lines in Fig. 1, such position in the illustrated embodiment representing a maximum tilt of the order of 30°. A greater degree of tilting may, of course, be obtained, if desired, by extending the operating travel of the device 15. Ordinarily, in tables for X-ray purposes, a 90° tilt in one direction, with a 30° tilt in the other, is adequate for all purposes.

It will be seen from the foregoing that the frame 12 is supported, in cantilever fashion, entirely from one side thereof, upon the pedestal 13, which may, in addition to the upright 24, comprise a transverse arm 38, preferably of sheet metal construction. This arm may conveniently comprise a channel member provided with a flange for attaching it at one end to the lower portions of the upright 24, as by means of bolts 39. When so attached, the arm 38 may extend beneath the table frame 12 to a point below the unsupported or rear side 19 thereof; and the member 38, at its end remote from the upright 24, may be provided with a flange for attachment, as by means of bolts 40, with a foot member 41, preferably comprising a hollow, sheet metal beam of rectangular sectional configuration.

The table frame 12, of course, may carry a top structure, secured to the frame 12 in any suitable or preferred fashion and embodying a panel 42, in position overlying the top of the frame. Immediately beneath the panel 42, the frame 12 may provide a mounting for a cassette and a diaphragm carriage 43, the same being provided with bearing wheels 44 in position to ride upon suitable tracks 45 on the frame members 18 and 19, so that the carriage 43 may be shifted to any desired position longitudinally of the frame 12.

The frame 12 also may provide support for adjustable frame means 46, said frame 46 being provided with wheels 47 in position to operate in tracks 48 extending longitudinally of and carried by the frame members 18 and 19. The frame 46, in turn, may carry a sub-frame, or frames, 49 supported by suitable roller elements for movement on the frame 46 transversely with respect to the table frame 12. This frame 49 may have a portion extending beneath and outwardly of the frame member 19 in position to carry an upstanding support structure 50 adapted to serve as a mounting for equipment such as an X-ray source 51. This upstanding mounting 50, the X-ray source and the mechanism for supporting the same on the mounting 50, may be of any suitable or preferred construction, such as illustrated and described in United States Letters Patent No. 2,315,786, issued April 6, 1943, on the invention of Julius J. Grobe, and the carriages 43 and 46 may be suitably counter-balanced to retain their position on the frame when the same is tilted by counter-balancing means disposed within the hollow table frame 12, in the manner described in my co-pending application for United States Letters Patent, Serial No. 684,650, filed July 19, 1946 and now United States Letters Patent No. 2,526,879. Suitable means for adjusting the carriages, the X-ray source and other auxiliary equipment and for locking the same in position may, of course, be provided.

Any suitable or preferred hydraulic operating and control means, also, may be provided for actuating the hydraulic device 15, including means for locking the device to hold the table in any tilted position within its range, and in its normal or horizontal position.

The upright 24 may conveniently comprise a hollow structure fabricated of formed sheet metal plates, welded or otherwise connected together. The upright may extend vertically beneath the table frame member 18, and may include a foot 52 disposed vertically beneath the bearing 26. This foot portion is preferably sized to fit between the side walls of the frame member 18, at the end thereof, when the table is in vertical position, as shown in dotted lines in Fig. 1; and, to this end, the bracing plate 22 may be omitted or cut away, at the end of member 18, to form an opening 53 to receive the foot 52. From said foot to the opposite end of the upright the same is formed to provide a space 54 to receive the toes of an operator of the table beneath and inwardly of the front wall of the upright, so that the operator may stand closely alongside of the table. The end of the upright remote from the foot 52 may be provided with an adjustable foot 54' for table leveling purposes, said foot conveniently comprising a stem threaded into the upright and adapted to support the same at a desired elevation above a floor on which the table may be supported. This adjustable foot 54' is preferably located substantially inwardly of the front face of the upright 24 to avoid interference with the toes of the operator. Adjustable feet, similar to the foot 54', may, if desired, be provided on the member 41, as shown in Figs. 1 and 6.

The present invention is directed more particularly to the exceedingly simple and novel arrangement embodying the single arm or link 14, which serves as the sole support of the table frame 12 on the pedestal 13, and which enables the use of a relatively simple and inexpensive, yet readily controllable hydraulic ram element 15 for tilting the table in either direction from the horizontal through an unusually wide range of tilting movement, the structure herein illustrated being tiltable through substantially 90° in one direction, and to an inclination of 30° in the other, a total tilting movement of 120°.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A tilting table structure comprising a support base, a table frame, means to support said table frame on said base, in cantilever fashion, comprising a link having pivotal connection respectively with said base and frame, on one side of the frame only, said link serving to support said table frame for tilting movement on the base on tilting axes defined by bearings spaced apart on said link.

2. A tilting table structure comprising a support base, a table frame, means to support said table frame on said base, in cantilever fashion, comprising a link having pivotal connection respectively with said base and frame, on one side of the frame only, said link serving to support said table frame for tilting movement on the base on tilting axes defined by bearings spaced apart on said link, cooperating means on the link and base to support the link on the base in normal stable position at a load station spaced from the pivotal connection of the link on the base, and cooperating means on the link and frame for supporting the frame on the link in stable position at a bearing station spaced from the pivotal connection of the link with the frame.

3. A tilting table structure, as set forth in claim 2, including extensible and retractable table tilting means connected between the table frame and base and operable in one direction from a neutral position to tilt the table frame and link on the base, in one direction from its normal stable position, about the pivotal connection of said link on the base, said tilting means being operable in the other direction, from said neutral position, to tilt the table frame, on the link and base, in the opposite direction from said normal stable position, about the pivotal connection of the table frame on the link.

4. A tilting table structure comprising a support base, a table frame, means to support said table frame on said base, in cantilever fashion, comprising a link having pivotal connection respectively with said base and frame, on one side of the frame only, said link serving to support said table frame for tilting movement on the base on tilting axes defined by bearings spaced apart on said link, said link comprising a hollow torque tube between said spaced apart tilting axes to rigidly support said table frame, in cantilever fashion, on said base by twistingly loading the torque tube between said tilting axes.

5. A tilting table structure comprising a support base, a table frame, means to support said table frame on said base, in cantilever fashion, comprising a link having pivotal connection respectively with said base and frame, on one side of the frame only, said link serving to support said table frame for tilting movement on the base on tilting axes spaced on said link, said link comprising a cylindrical torque tube having spaced apart pin bearings secured thereto in position defining said spaced tilting axes and a pivot pin extending in each of said bearings and secured respectively on said base and table frame.

6. A tilting table structure comprising a support base, a table frame, means to support said table frame on said base, in cantilever fashion, comprising a link having pivotal connection respectively with said base and frame, on one side of the frame only, said link serving to support said table frame for tilting movement on the base on tilting axes defined by bearings spaced apart on said link, and means on said link for supporting said frame on the link substantially at the pivotal connection of the link on the base whereby the table frame may be pivotally supported on the link at one of said spaced axes and bearingly supported thereon adjacent the other.

7. A tilting table structure comprising a support base, a table frame, means to support said table frame on said base, in cantilever fashion, comprising a link having pivotal connection respectively with said base and frame on one side of the frame only, said link serving to support said table frame for tilting movement on the base on tilting axes defined by bearings spaced apart on said link and connected respectively with a frame pivot pin on said table frame and a base pivot pin on said base, said link having a frame support portion spaced from said frame pivot pin, beyond said base pivot pin, to normally support the table frame on said link at said frame pivot pin and at said frame support portion disposed in said link on opposite sides of said base pivot pin.

8. A tilting table structure comprising a relatively wide upright member of limited thickness providing a support base having appreciable spread in the direction of its width, base pivot means formed in the upper portions of said base, a table frame comprising a hollow longitudinally extending channel member formed to receive and enclose the upper portions of said base, frame pivot means on and extending within said channel member, and means to support said table frame, in cantilever fashion, on said base comprising a torque link extending in said channel member and having spaced pivots respectively forming pivotal connection with said base and frame pivot means, to thereby support said frame on said base, at one side of the frame only, through twisting load applied to said link at said spaced pivots.

9. A tilting table structure comprising a relatively wide upright member of restricted thickness providing a base having an appreciable spread in the direction of its width, base pivot means and an adjacent upwardly facing shoulder formed in the upper portions of said base, a table frame, frame pivot means on said frame at one side thereof, means to support said table frame, in cantilever fashion, on said base comprising a link having pivotal connection, at spaced pivot stations in the link, respectively, with said base and frame pivot means, to thereby support said link and frame for tilting movement on said base about said base pivot means and to support said frame for tilting movement on said link and base about said frame pivot means, said link being normally supported on said base pivot and on said upwardly facing shoulder.

10. A tilting table structure comprising a relatively wide upright member of restricted thickness providing a base having appreciable spread in the direction of its width, base pivot means formed in the upper portions of said base, a table frame comprising a hollow longitudinally extending channel member adapted to receive and enclose the upper portions of said base, frame pivot means on and extending within said channel member, and a link extending in said channel member and having pivotal connection, respectively, with said base and frame pivot means, whereby to support said link and frame respectively for tilting movement on said base and on the link, on tilting axes spaced apart on said link, said base having a supporting foot disposed substantially vertically beneath the base pivot means, said foot being disposed in position to be received within said hollow channel member, at an end thereof, when said frame is in vertical position, on said base pivot.

ARTHUR J. KIZAUR.

REFERENCES CITED

The following references are of record in the file of this patent:

UNITED STATES PATENTS

| Number | Name | Date |
|---|---|---|
| 467,991 | Frederick | Feb. 2, 1892 |
| 529,210 | Storz et al. | Nov. 13, 1894 |
| 632,804 | Congour | Sept. 12, 1899 |
| 729,432 | Sidway et al. | May 26, 1903 |
| 971,081 | Schnorr | Sept. 27, 1910 |
| 1,261,424 | Miller | Apr. 2, 1918 |
| 1,599,696 | Wantz | Sept. 14, 1926 |
| 1,728,933 | Hawkins | Sept. 24, 1929 |
| 1,872,849 | Towens | Aug. 23, 1932 |
| 1,874,582 | Nelson | Aug. 30, 1932 |
| 1,916,537 | Smith | July 4, 1933 |
| 2,038,327 | Wantz | Apr. 21, 1936 |
| 2,123,528 | Goldfield et al. | July 12, 1938 |
| 2,306,031 | Anderson et al. | Dec. 22, 1942 |
| 2,315,786 | Grobe | Apr. 6, 1943 |

FOREIGN PATENTS

| Number | Country | Date |
|---|---|---|
| 358,059 | Great Britain | Oct. 2, 1932 |
| 493,280 | Great Britain | Oct. 3, 1938 |